April 25, 1967
C. H. CLEWS
3,315,470
PRESSURE APPLYING DEVICES
Filed Aug. 10, 1965
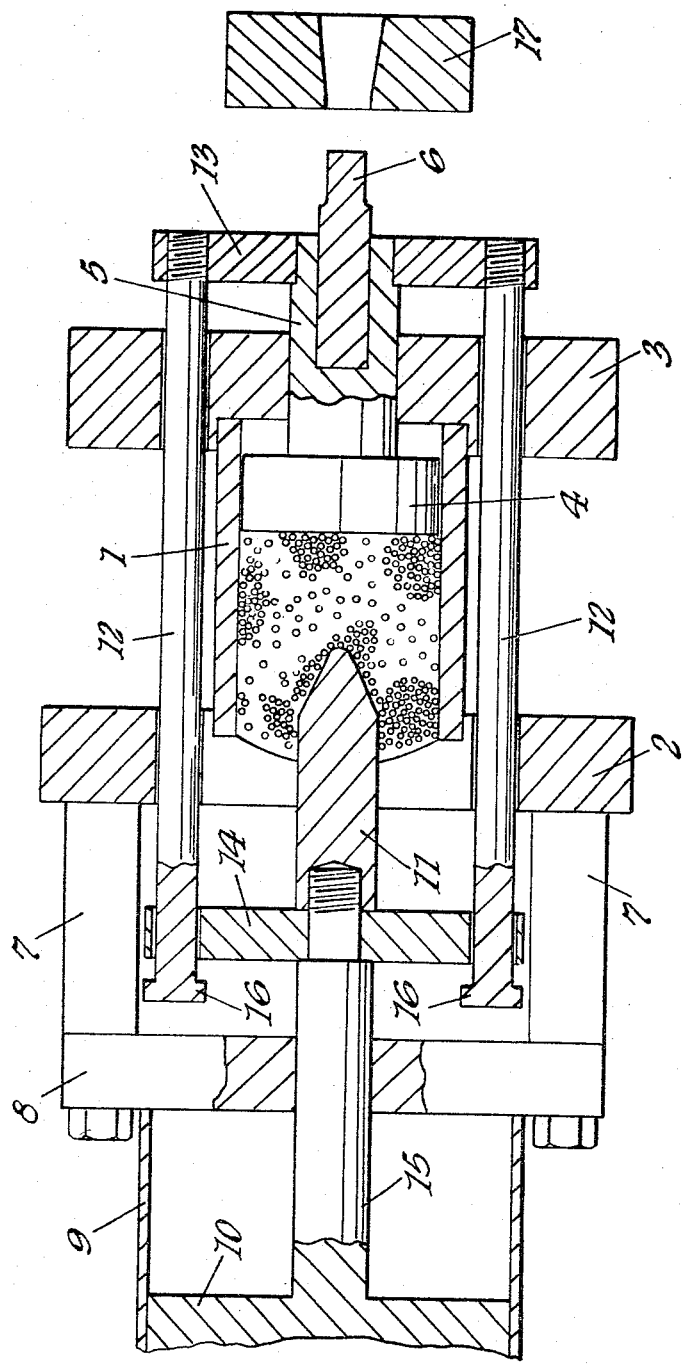

3,315,470
PRESSURE APPLYING DEVICES
Charles H. Clews, 177 Barns Lane, Rushall,
Walsall, England
Filed Aug. 10, 1965, Ser. No. 478,684
2 Claims. (Cl. 60—54.5)

ABSTRACT OF THE DISCLOSURE

A pressure applying device having a drive member and a driven member and a piston and cylinder arrangement therebetween arranged to intensify the normal force or forces applied through said drive member and delivered by said driven member.

---

This invention relates to pressure applying devices such as may be used, for example, for operations involving punching, squeeze riveting, clamping, or like operations.

It is an object of the present invention to provide a pressure applying device of the kind stated that utilises a piston and cylinder arrangement to intensify the normal force or forces available for operating the device.

It is a further object of the present invention to provide a pressure applying device of the kind stated in which said piston and cylinder unit is capable of operating without loss of the medium acting on the piston head in the cylinder.

It is a further object of the invention to provide a pressure applying device of the kind stated in which the piston head has a clearance fit in said cylinder to reduce friction losses.

According to the present invention a pressure applying device comprises a cylinder, a piston head in the cylinder, a first piston rod extending from one face of said piston head and projecting through one end of the cylinder for use as the intensified pressure delivering member of the device, a second piston rod extending into the cylinder and means for displacing said second piston rod relatively to the cylinder, said second piston rod terminating in a head having an effective cross-sectional area that is smaller than that of the piston head on the first piston rod, characterised in that the medium in the cylinder for transmitting to the piston head on the first piston rod pressure changes created by movement of the second piston rod comprises a mass of small balls.

The end of the second piston rod that terminates the cylinder is preferably of conical or other pointed form to facilitate movement of the second piston rod relatively to the mass of small balls in the cylinder.

The second piston rod preferably extends axially of the cylinder but it will be appreciated that it may extend transversely thereof if desired.

To reduce frictional losses the piston head on the first piston rod moves with clearance in the cylinder, said clearance being insufficient for the small balls to be wedged therein or to escape from the cylinder. For similar reasons the second piston rod may have the same clearance relatively to the cylinder end or wall through which it extends.

The second piston rod may be actuated by any suitable means, for example a low pressure operated cylinder utilising a gaseous or liquid medium; lever arrangements, or screw actuated means.

It will be appreciated that by suitably proportioning the relative dimensions of the second piston rod and the head on the first piston rod a desired intensified force can be delivered by the first piston rod when the second piston rod is actuated.

The present invention ensures that the device will be capable of performing short power strokes without loss of movement as it is not possible for any of the small balls to escape from the cylinder.

In order that the invention may be clearly understood, reference will now be made to the accompanying drawing showing, by way of example only, a cross-section of one embodiment of a device constructed according to the present invention.

As shown the device comprises a cylinder 1 housed between end members 2, 3 interconnected by tie rods (not shown).

Sliding with clearance within the cylinder 1 is a piston head 4 coupled to or integral with a piston rod 5 extending outwardly through the end member 3 and housing a punch 6 in its outer end.

Secured by tie rods 7 to the end member 2 is a flanged member 8 carrying a cylinder 9, there being a piston head 10 in cylinder 9 that is used to reciprocate a piston rod 11 extending through the end member 2 and into the cylinder 1. The end of the piston rod 11 that terminates in the cylinder 1 is cone-shaped and the effective cross-sectional area of the nose of the piston 11 is less than the effective cross-section of the piston head 4.

Extending through the end members 2, 3 are at least two rods 12, the rods 12 being rigid, at one end, with a first cross-member or plate 13 carried by the piston rod 5 and passing at their other ends through a second cross-member or plate 14 secured between the piston rod 11 and a piston rod 15 actuated by the piston head 10. The ends of the rods 12 that extend through the second cross-member or plate 14 are flanged as at 16 to trap the second cross-member or plate 14 on the rods 12.

The cylinder volume between the piston rod 11 and the piston head 4 is filled with small steel balls and the aforesaid clearance fit between the piston head 4 and the cylinder 1 is insufficient to cause jamming thereof by the small steel balls or escape of the small steel balls.

In operation the piston head 10 is moved, in the direction of a die 17, by applying a pneumatic or hydraulic pressure thereto and this causes the cone-nosed piston rod 11 to force its way into the mass of small steel balls filling the cylinder 1. The small steel balls then transmit the pressure created by the movement of the piston rod 11 therein to the surface of the piston head 4 to cause the punch 6 to perform its operating stroke with an intensified force compared with that which is applied to the piston head 10.

When the piston head 10 performs its reverse stroke the second cross-member or plate 14 moves relatively to the rods 12 until it engages the flanged ends 16 of the rods 12 whereafter the rods 12 move with the cross-member or plate 14 and so retract the punch 6 from the die 17.

It will be appreciated that various modifications may be made to the particular embodiment described.

Thus, for example, the nose of the piston rod 11 need not be conical but may be of rounded form or of any other suitable shape.

Also, the rods 12 may be rigid with the cross-member or plate 14 and extend in a slidable manner through the cross-member or plate 13, the ends of the rods 12 extending through the cross-member or plate 13 being flanged to trap the cross-member or plate 13 thereon so that the piston rod 5 can be retracted when the piston rod 11 is retracted.

I claim:

1. A pressure applying device comprising a cylinder, a piston head that is slidably mounted in the cylinder, a first piston rod rigid with said piston head and extending out of the cylinder for use as an intensified pressure delivering member, a second piston rod extending into the cylinder, said second piston rod having a cross-sectional area that is less than the cross-sectional area of said piston head, and a mass of small balls within the cylinder for transmitting to the piston head pressure created by movement of the second piston rod towards said piston head, said first and second piston rods extending in the same direction, mechanical means interconnecting said first and second piston rods such that the second piston rod is free to move toward the piston head on the first piston rod, the second piston rod can only be retracted from the piston head on the first piston rod by a predetermined amount before said mechanical means causes the first piston rod to retract with the second piston rod.

2. A pressure device as claimed in claim 1 and wherein said mechanical means includes a plurality of rods that are parallel with the pistons, said rods being outside the cylinder and being rigidly coupled at one end to a cross-member or plate carried by the first piston, said rods extending at their other ends through a cross-member or plate carried by the second piston rod and terminating in ends against which the cross-member or plate carried by the second piston can abut when retracted.

References Cited by the Examiner
UNITED STATES PATENTS

| | | | |
|---|---|---|---|
| 1,885,235 | 11/1932 | Davis | 60—54.5 X |
| 2,610,614 | 9/1952 | Sedgwick | 60—54.5 X |
| 2,644,528 | 7/1953 | Ragan | 60—54.5 X |
| 2,725,776 | 12/1955 | Hopkins | 60—54.5 X |
| 3,059,433 | 10/1962 | Hirsch | 60—54.6 X |
| 3,071,930 | 1/1963 | Moulin | 60—54.6 X |

FOREIGN PATENTS 856,725  12/1960  Great Britain.

MARTIN P. SCHWADRON, *Primary Examiner.*

ROBERT R. BUNEVICH, *Examiner.*